Sept. 13, 1966  P. J. WEAVER  3,272,039
MACHINE TOOL CYCLE CONTROL
Filed May 26, 1965  3 Sheets-Sheet 1
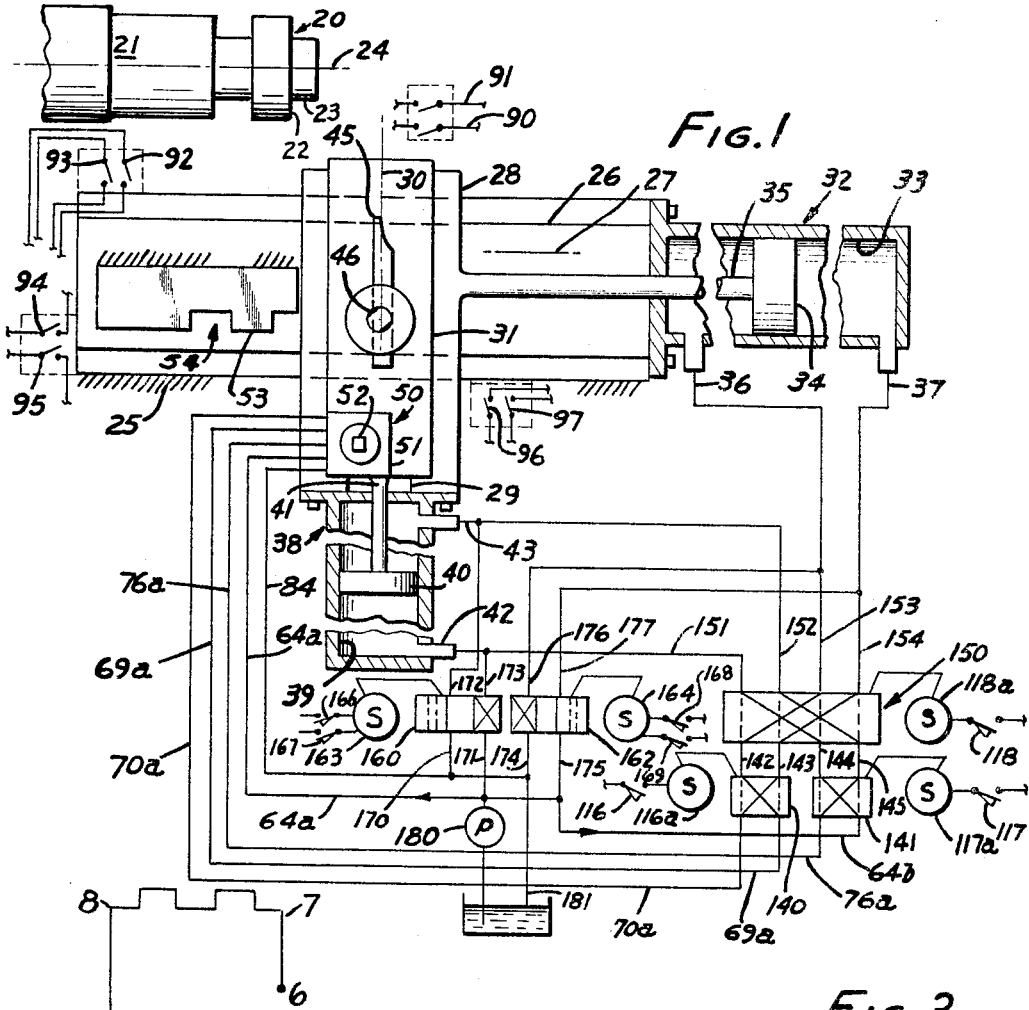
FIG.1
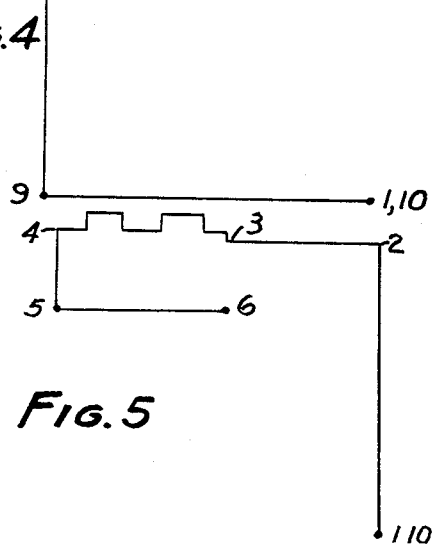
FIG.4
FIG.5
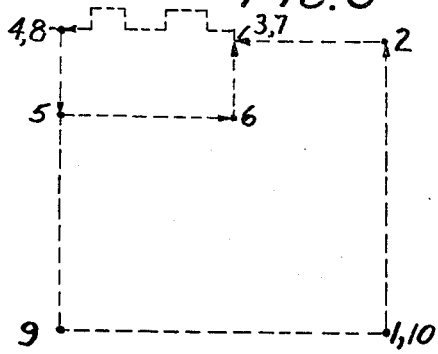
FIG.3
INVENTOR.
PAUL J. WEAVER
BY
ATTORNEYS.

Sept. 13, 1966   P. J. WEAVER   3,272,039
MACHINE TOOL CYCLE CONTROL
Filed May 26, 1965   3 Sheets-Sheet 2
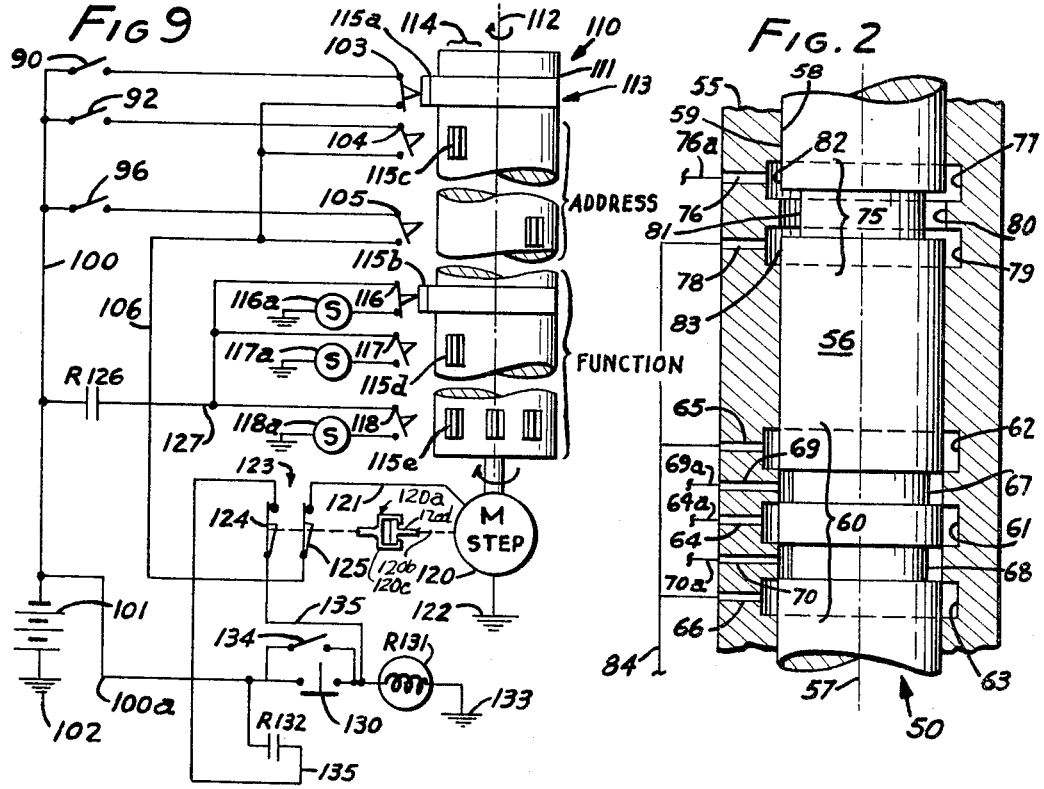
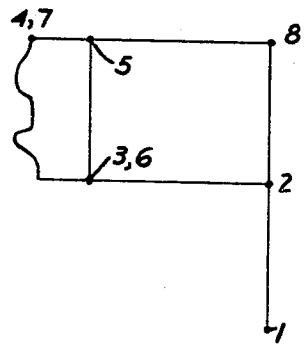
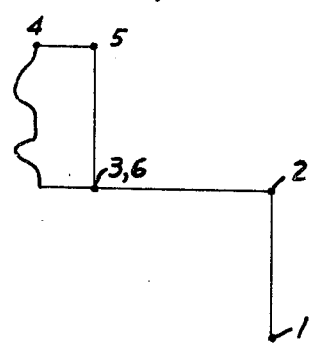
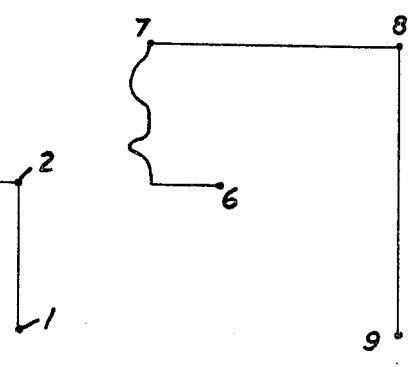
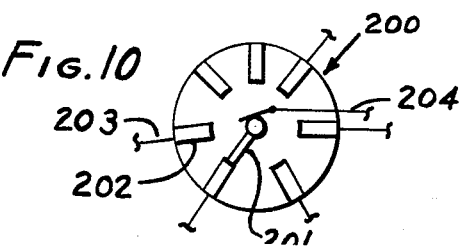
INVENTOR.
PAUL J. WEAVER
BY
ATTORNEYS.

Sept. 13, 1966 P. J. WEAVER 3,272,039
MACHINE TOOL CYCLE CONTROL
Filed May 26, 1965 3 Sheets-Sheet 3

INVENTOR.
PAUL J. WEAVER
BY
ATTORNEYS.

United States Patent Office 3,272,039
Patented Sept. 13, 1966

3,272,039
MACHINE TOOL CYCLE CONTROL
Paul J. Weaver, Pasadena, Calif., assignor to True-Trace Corporation, El Monte, Calif., a corporation of Connecticut
Filed May 26, 1965, Ser. No. 458,962
19 Claims. (Cl. 82—14)

This invention relates to a machine, and to a control system therefor.

Numerous machines, especially in the metal cutting trades, have a requirement for automatic cycling of various functions. For example, in tracer valve controlled machinery, it is frequently desired to make a multiplicity of passes between the cutter and the workpiece, perhaps substituting different functions such as rapid retract, approach or traverse, and a various selection of styluses and tools along the way. Furthermore, it might be desired to take somewhat different paths or directions of paths so as to turn, or face, or climb mill or conventionally mill a workpiece. It is desirable to lower the expense of operating such a machine, and to reduce chances for error by automatically programming the machine so that it will go through its sequence without requiring detailed attention of the operator each time. Attempts have heretofore been made to secure such automatic functioning, but in general these have suffered from requirements of unduly complicated wired circuits, or too little flexibility for the purpose intended.

It is an object of this invention to provide a control for a machine tool which can operate through various sequences of operations so as to cause the tool to go through a plurality of programmed steps under the direction of a control.

It is an optional object of this invention to provide a control which is readily adapted for providing many permutations of control functions by the simple substitution of cam assemblies.

It is still another optional object of this invention to provide a machine tool control which enables the machine to go through sequences of permutations of functions, either automatically or step by step under control of the operator.

It is still another optional object of this invention to provide a machine tool control in which any automatic functions may be manually overridden by the operator.

This invention is adapted for use with a machine tool of the class which has a bed, a first slideway mounted on the bed, a first slide mounted on the first slideway, a second slideway mounted on the first slide, and a second slide mounted to the second slideway. Such a classification includes machines such as chuckers, lathes, mills, and the like. The slideways have respective axes which are non-parallel, and the slides are movable along the respective slideway axes. Such a machine customarily includes a workpiece holder and a cutting tool which are moved relative to one another to form a desired workpiece. It is a function of this invention to cycle the tool and the workpiece holder relative to one another in such a way as to accomplish the desired machining operation.

In one preferred embodiment of the invention, there is also included a template and a tracer valve which includes a stylus that is adapted to trace over the contour of the template so that at least one portion of the cycle can include a tracing operation, if desired.

It is still another preferred feature of the invention that the cycling control includes switch actuators disposed on a movable base to present sequential ranks and rows. The switch actuators are disposed at selected locations so as to selectively make contact with address switches and function switches respective to a given rank. The address switches are responsive to selected ones of limit switches that are placed on the machine tool where they will be contacted when the slides reach the limit of their desired movement, and the function switches are adapted to select functions for the machine tool appropriate to a respective portion of the program.

The above and other features of this invention will be fully understood from the following detailed description and the accompanying drawings in which:

FIG. 1 is a plan view partly in cutaway cross-section of a chucker including the cycling control of this invention;

FIG. 2 is a fragmentary longitudinal cross-section of a tracer valve useful in FIG. 1;

FIG. 3 shows one class of program which can be achieved by the device of FIG. 1;

FIGS. 4 and 5 are schematic illustrations of portions of the program of FIG. 3;

FIG. 6 shows another class of program which may be achieved by the device of FIG. 1;

FIGS. 7 and 8 are schematic illustrations of portions of the program of FIG. 6;

FIG. 9 is a portion of the control circuit utilized in FIG. 1;

FIG. 10 is a fragmentary showing of a rotary stepper switch; and

FIGS. 1 and 9 show the presently preferred embodiment of the invention. This invention is shown in use on a chucker 20 which is merely one type of machine tool on which a cycling control according to the invention may be utilized.

Figure 11:
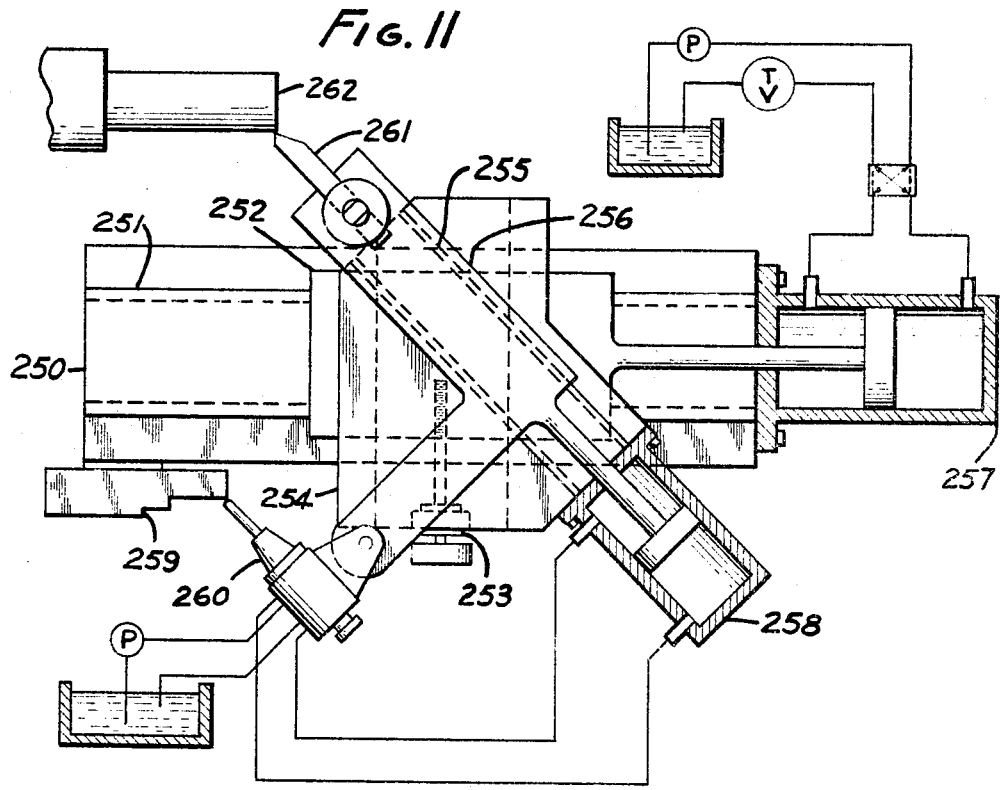
FIG. 11 shows still another machine tool configuration with which this invention is useful.

The chucker includes a headstock 21 with a chuck 22 that serves as a workpiece holder for workpiece 23. The chuck rotates around axis 24.

The chucker includes a bed 25, this bed having a first slideway 26 formed thereon. It is a dovetail slideway. It extends along first axis 27. A first slide 28 is axially shiftable along first axis 27. This first slide carries a second slideway 29 atop it (which may also be a dovetail slideway), and this slideway has a second axis 30 which is non-parallel to axis 27. In conventional machinery, the two axes are perpendicular to each other, although they may, if desired, be disposed at a different relative angle, for example, 45°. A second slide 31 is axially movably mounted on second slideway 29. It will now be seen that the second slide is capable of motion in all directions and to all points in the plane of FIG. 1, within the physical limits of the machine.

First slide motive means 32 is provided for shifting the first slide along axis 27. Means 32 comprises a cylinder 33 fixed to the bed that encloses a piston 34. A rod 35 passes outside the cylinder and is attached to the first slide so that motion of the piston will result in corresponding motion of the first slide. Ports 36, 37 pierce the cylinder on opposite sides of the piston so as to receive and exhaust fluid for the purpose of moving the piston.

Second slide motive means 38 comprises a cylinder 39 fixed to the first slide, and further includes a piston 40 and rod 41. Rod 41 interconnects piston 40 and second slide 31 so that motion of the piston in the cylinder results in corresponding motion of the second slide relative to the first slide. Ports 42, 43 pierce the wall of the cylinder on opposite sides of the piston so as to pass fluid for the purpose of moving the piston.

It will be understood that other classes of motive means could be utilized. For example, rotary fluid motors operating standard screw drives could be used for either or both of said means. The type of motive means is of no importance to this invention, so long as it is responsive to power applied thereto.

It will now be seen that the first slide may be moved around in the plane of FIG. 1 along axis 27 by selective application of fluid under pressure or exhaust to opposite sides of its pistons.

The same is true of the second slide relative to the first slide along axis 30. The function to be accomplished is the movement of cutting tool 45 relative to the workpiece so as to form a desired contour. Cutting tool 45 is held in a tool holder 46 that is mounted to the second slide. Also mounted to the second slide is a tracer valve 50. This tracer valve includes a body 51 from which there projects a stylus 52 that is adapted to contact and follow contour 53 of a template 54. Template 54 is mounted to a template rail (not shown) on the bed of the machine.

The function of tracer valves is well known. The stylus traces over the contour of the template and, in so doing, causes the motive means to operate so as to duplicate this motion between the cutting tool and the workpiece. For this purpose, the operative elements are provided in pairs. A first pair is the tracer valve and the template, while the second pair is the cutting tool and the workpiece. One member of each of these pairs is mounted to the bed, and the other member of each pair is mounted to the second slide. Conventional practice is as shown, wherein the template and the workpiece are mounted to the bed, and the cutting tool and tracer valve are mounted to the second slide.

The details of a suitable valve for tracer valve 50 are shown in FIG. 2. Full details of this class of valve may be found by reference to Paul J. Weaver Patent No. 3,055,393, issued September 25, 1962. Only a short recapitulation of the features of this valve will be shown here. Persons desiring a more complete description of the valve and its operation may refer to the aforesaid patent. Briefly, the tracer valve includes a valve sleeve 55 and a valve spool 56. Lateral deflection of the stylus causes a proportional relative axial motion to occur between the spool and the sleeve, and the fluid circuitry setup attempts to nullify this displacement. The process of nullifying the displacement causes the reproduction of the desired contour by relatively shifting the cutting tool and workpiece.

Sleeve 55 and spool 56 have a common central axis 57. The sleeve includes an internal cylindrical wall 58, and the spool includes an external cylindrical surface 59. The wall and surface are in close fluid-sealing contact with each other, and there is only insignificant seepage along the interface between them.

The tracer valve includes two segments. The first is a tracer segment 60 which is in the nature of a four-way valve. In the best known embodiment of tracer segment, an example of which can be found in the aforesaid Paul J. Weaver patent or in Rosebrook Patent No. 2,753,145, issued July 3, 1956, the cylindrical wall 58 includes a pressure groove 61 and exhaust grooves 62, 63 on opposite sides of the pressure groove. Pressure inlet port 64 passes through the sleeve and communicates with groove 61. Exhaust ports 65, 66 pass through the wall of the sleeve and communicate with exhaust grooves 62, 63. The external surface 59 of the spool includes a pair of motor supply grooves 67, 68. These grooves stand opposite the lands between the pressure groove and the two exhaust grooves and are usually of about the same length, although this may vary from installation to installation. They stand opposite motor supply ports 69, 70, which pass through the wall of the sleeve.

It will be seen that when the spool moves upward relative to the sleeve, then groove 68 overlaps pressure groove 61, and pressure will be communicated to motor supply port 70. At the same time, motor supply port 69 will communicate through groove 67 to groove 62 and out exhaust port 65. In this manner, a line connected with port 70 will be under pressure, and a line connected to line 69 will be under exhaust. If the spool moves downward relative to the sleeve, the opposite occurs, for new groove 67 would overlap groove 61, and pressure would be exerted at port 69. Also, groove 68 would overlap groove 63, and port 70 would be connected to exhaust port 66.

It will thereby be seen that shifting of the spool either way from the null condition shown will cause one or the other of the motor supply ports to be under pressure, and the other under exhaust. At the null position, both lines are evenly balanced, and no net flow results. Then the motor would not operate, because there would be no pressure differential across it.

The particular tracer valve shown in FIG. 2 includes, in addition to a tracer segment (which is sufficient for many embodiments) a coordinator segment 75. This coordinator segment is optional. It includes an inlet port 76 which passes through the wall of the sleeve to communicate with an inlet groove 77. An exhaust port 78 and exhaust groove 79 are spaced from the respective elements 76 and 77 so as to leave an intermediate land 80 between them. This land has a dimension of axial length.

The spool carries a bypass groove 81 which has an axial length somewhat greater than that of land 80. When the spool is in the null condition, it will be seen that fluid flow can occur downwardly from groove 77 through bypass groove 81 to exhaust groove 79. However, if the spool is shifted in either direction from the null condition shown, it will be seen that cutoff lands 82, 83, which are on opposite sides of bypass groove 81, move relative to the intermediate land, and that one of them will move axially closer to it, thereby throttling down the flow between the inlet and exhaust grooves. Therefore, the highest rate of flow through the coordinator segment will occur when the valve is at null, as illustrated, and it will be decreased and perhaps even cut off entirely, as the spool moves farther from the null condition in either direction.

All of the grooves and lands may be made fully peripheral, if desired, or may be modified in the manner shown in said Paul J. Weaver Patent No. 3,055,393, issued September 25, 1962.

Exhaust ports 65, 66 and 78 are all connected to a common exhaust line 84. Motor supply lines 69a, 70a are connected to motor supply ports 69, 70, respectively. Pressure supply line 64a is connected to motor supply port 64. An inlet line 76a is connected to inlet port 76. These lines may now all be referred to tracer valve 50 in FIG. 1.

As one selectable function, it may be desired to choose which, if either, of the motive means will be under control of the tracer segment and which, if either, will be under the control of the coordinator segment. It is the function of the illustrated tracer valve that as the tracer segment permits a greater rate of movement along one of the axes, the rate of motion along the other axis is slowed down. This keeps the surface travel of the tool relative to the workpiece at a sensibly constant value. If this is not desired, then of course the axis not under control of the tracer segment could simply be subjected to a conventional constant feed, which is still another selectable function. In any event, it will be desired to determine which way the tracer valve will seek the template, for example in the setup shown, the feed may be to the left, and the template may be upward in FIG. 1. This, too, is a selectable function. The said permutation will then cause the turning motion to be to the left, and tracer seek up (or "in"). Then, in operation, the tracer segment should be connected across ports 42 and 43, while the coordinator segment should be connected across ports 36 and 37. Should the feed have been the opposite direction, then the application of pressure fluid would have been reversed between ports 36 and 37. Should the seeking direction of the stylus have been reversed, then the connections to ports 42 and 43 would have been reversed. Similarly, should the tracer segment be desired to be exerted along the first axis, as for example if facing were being done instead of turning, then the connections previously made to ports 42 and 43 would be applied to ports 36, 37 and vice versa, with similar provisions being available for changing the direction of seek and of feed within the respective motive means. It will thereby be seen that merely considering as functions the selection of which motive means is under feed control and which is under tracer control comprises a selection of function. Similarly, so does the direction in which they are to move and, for that matter, whether they are to be under the control of anything at all, and, if so, of what. Other selectable functions could be of tool, stylii of various sizes, and control of auxiliary equipment such as coolant pumps and the like. In any event, these selections and the controls which cause them are called function controls.

In programming the device, it is desired to establish a program of selected functions step by step, and to provide a selected permutation of functions for each next step as the last one is completed.

This is the function of the control shown in FIG. 9, which itself is basically under the control of limit switches 90–97, that are placed in various locations around the machine tool. It will be understood that while these are shown in pairs, more or fewer than two may be provided at each and at other locations, and that they are generally placed on supports whose position is adjustable. Basically, they are fastened down relative to the machine tool bed as related to motion along some axis, but it will be understood that they can be placed in different locations so long as they are responsive to the attainment of a position by an object whose position is to be controlled.

For example, switches 90 and 91 are shown in the path of second slide 31, where they will be struck at two different axial positions along second axis 30. Limit switches 92, 93 are disposed where they will be struck by the second slide at positions relative to its motion to the left. Switches 94, 95 are placed where they will be struck by the second slide or some extension thereof on its motion outward from the axis of the tool holder, and switches 96, 97 are placed where they will be struck at positions of the second slide, or even of the first slide, in its motion toward the right in FIG. 1. It is obvious that switches 92, 93 may be related solely to the first slide as to its motion to the left and right, respectively, while switches 90, 91, 94 and 95 may be related to the second slide relative to its positions along second axis 30. It will further be noted that one of the switches in these groups permits farther motion than the other. As can be seen hereafter, some can be overridden and customarily roller-type switches will ordinarily be used to accommodate this feature.

Switches 90, 93 and 96 are selected at random for illustration, and are shown in FIG. 9. These are connected to a common power line 100 as will be one terminal of each of all limit switches which are provided. Line 100 is connected to a power source 101, such as a battery with a ground 102, or any other desired source of electrical potential. It will thereby be seen that all of the limit switches are able to pass power when contacted by respective portions of the machine tool which will close the same. Each of these limit switches is connected serially with a respective address switch, of which switches 103, 104, 105 are selected as examples. In the preferred embodiment of this invention, every one of the limit switches will be connected to an individual address switch, unless the system is such that the limit switches have a common purpose, although differently placed, in which event they could be wired to the same address switch. The other sides of the address switches are connected to a common output line 106 so that whenever both members of any pair of respective limit switches and address switches are simultaneously closed, then power from source 101 is passed to output line 106.

From the foregoing, it will be seen that the address to be controlled may be selected by determining whether one of the address switches is closed at the time when one of the limit switches is closed, and this permits a wide selection of addresses as related to limit switches. The selection of specific limit switches is accomplished by use of a switch controller 110 which includes a drum 111. This drum comprises a movable base, in this case one which is rotatable around an axis of rotation 112. The surface of this drum may be considered divided up into a plurality of vertical ranks and peripheral rows 113, 114, respectively. Within these ranks and rows, there are disposed switch actuators 115. These switch actuators comprise protrusions which project beyond the surface of the drum. They may readily be removed from or applied to the surface of the drum. For example, considering actuator 115a, when the respective rank is aligned with a switch in the same row, then the switch, for example switch 103, is closed. However, when there is no actuator in the rank and row opposite one of the switches, such as switches 104 or 105, then the respective switch is open. It will thereby be seen that by the selection of rank and row in which to place an actuator, a program may be selected, and a specific program is that which is defined by the presence or absence of a switch actuator in a given row for a given rank, when the rank on the drum registers with a rank of switches. The rank of switches includes actuator switches 103–105 which have already been described, and in addition function switches 116, 117, 118, which are again shown by way of example, and do not represent any particular number of such switches which may be desired or desirable for a particular machine tool.

The function switches are similarly controlled by the presence or absence of switch actuators in respective ranks and rows. In the example shown, switch 116 is shown closed by an actuator 115b, while switches 117 and 118 are open, the latter because of the absence of a switch actuator opposite them.

Address switches 103–105 are opposite rows on the drum which will be referred to hereafter as address rows. Function switches 116–118 are opposite rows defined hereafter as function rows. The drawings indicate that the length of the drum is indeterminate as is the number of ranks and rows. Similarly indeterminate is the number of address switches and function switches, all of which are determined by the usage for which the control is to be used. In very simple tools with unsophisticated requirements, the switches, ranks and rows will be few in number, while in more sophisticated controls, many more might be required.

The switch controller is rotated by means of a stepper means 120. This stepper means comprises a stepper motor which includes a coil (not shown) supplied by a power line 121. The other side of the coil is grounded at ground 122. This is of the class of stepper motors which cock when actuated and then cause the stepping motion of the drum to occur when the current is cut off. Energizing the coil of the stepper motor actuates an escapement (not shown). When the escapement is loaded, an interrupter switch 123 is actuated. The interrupter switch includes two normally closed switches 124, 125. These switches are opened when the stepper means is fully cocked, and one of them serves to break the circuit through the coil of means 120, enabling the escapement to step the drum by one rank, so as to bring the next rank on the drum into registration with the rank of switches. There is a lost-motion or delay link 120a in the linkage 120b interconnecting the stepper means with switches 124 and 125. The effect of this lost-motion link is to permit the motor to cock fully before switch 123 is opened. This delay is needed because premature opening of switch 123 might prevent full cocking of the motor. The delay in re-closing the switch is needed to keep any circuitry from being reactivated while the drum is being stepped. The switch follows part 120c of link 120a. Plunger 120d floats in part 120c, and follows stepper 120.

Relay contacts 126 are connected between power line 100 and a function line 127. Function line 127 in turn connects to one terminal each of all function switches, such as function switches 116–118. In turn, the other terminals of each of the switches are connected with respective function controllers 116a, 117a, 118a. These controllers are all grounded. In the preferred embodiment of the invention, these controllers may be such as solenoids which include coils in the circuit between the respective function switches and grounds, and are effective to control the setting of a valve or some other control device. It will now be seen from the foregoing that different switch actuators in the different ranks will cause different permutations of function selectors to be active and that such permutations may be arranged for merely by determining where and in which ranks and rows the switch actuators are placed. It will further be noted that different permutations of function switches will come into play in association with the same or different limit switches, depending on the rotational setting of the drum relative to the rank of switches.

The circuit of FIG. 9 illustrates that whenever any of the limit switches, such as limit switches 90, 93 or 96, is closed at a time when there is a switch actuator opposed to and closing the function switch associated with the specific limit switch, a current will be applied to common output line 106 through switch 125, power line 121, through the motor to ground 122. This will step the motor to the next position so that another rank of switch actuators is opposed to the rank of switches, the opening of switch 125 breaking the stepping current. Now the cycle will begin anew, depending on what function switches are set up in combination with switch actuators until another limit switch is struck which is opposed to one of the switch actuators. In this case, the next limit switch controlling would be limit switch 93, and switch 104 would be closed by switch actuator 115c.

Also in this next position, switch actuators 115d and 115e would become effective on function switches 117 and 118, thereby energizing function controllers 117a and 118a. Switches 103 and 116 would be open. This is an automatic stepping circuit which would continue in steady sequential operation until a rank is reached wherein no switch actuator is opposed to any function switch, in which case the machine would shut down. This control provides also for a step by step operation which is particularly useful in setting up a machine.

It may be that an operator would like to step through the program one step at a time at first in order to be sure that all limit switches are correctly set, and that the program is accurate. For this purpose, a selector switch 130 is provided which, when closed, permits the automatic operation just described. This switch is connected to power line 100 through a branch 100a. Serially connected with selector switch 130 is a relay coil R131 which is effective on relay contacts R126 and also on relay contacts R132. These contacts are normally open when the relay is not actuated and are closed when the relay coil is energized. The relay coil is grounded at ground 133. Therefore, when selector switch 130 is closed for automatic operation, relay contacts R126 are closed, and the aforesaid operation may continue.

For single step operation, switch 130 is open, but it will be noted that it is shunted by a single-step switch 134 which, when closed, will energize coil 131, the same as switch 130, except only for the period of time that switch 134 is closed. It will ordinarily be spring-loaded open. In order to provide for the continued operation after switch 134 reopens, a latch circuit is provided which includes a lead 135 connected to coil 131 and through switch 124 to lead 135, through contacts R132 to branch 100a on the opposite side of single-step switch 134. A latch circuit is thereby provided which bypasses switches 130 and 134.

When relay 131 is energized by closing switch 134, it also closes contacts R132 and a holding current passes through switch 124 to the relay which keeps itself latched on through this latch circuit. This latch circuit, however, is broken when the stepper means 120 steps over, switches 124 and 125 being ganged together. This breaks the latch circuit and deenergizes relay 131 which thereby opens contacts R126 and R132, shutting down all function switches until once again switch 134 is closed. This gives a step-by-step means for checking out the adjustment of the machine tool.

Now having been given the means for selecting and controlling the various functions, a few exemplary functions will be described with reference to FIG. 1. Two cross-over valves 140, 141 are shown. The function of these valves is illustrated schematically, the solid lines indicating that a pair of lines may be crossed so as to switch connections in the valve, or they may go straight through as indicated by dotted lines. For example, motor supply lines 69a and 70a are connected to cross-over valve 140. These may either go straight through the valve in accordance with the dotted line notation, perhaps when its function controller is deactuated, or may be crossed over as shown in solid lines when the function controller is energized, because these arrangements are alternative with energizing or deenergizing the function controllers. Thus, as to lines 142, 143, these may selectively be connected to either of lines 69a or 70a, depending on the condition of the function controller which might, for example, be function controller 116a shown with its function switch 116. Similarly, lines 64b and 76a may be switched back and forth between lines 144 and 145 by virtue of actuation of its function controller, which might be function controller 117a shown with its function switch 117.

Next, these lines 142–145 enter a function director 150, which function director is a valve similar in nature to that of the cross-over valves except it crosses the lines over in pairs. In addition to the two "active" settings shown, it has a "null" or shut off position of no flow, such as valve 160 has. Function controller 118a represents only one of two of such devices. It will switch the valve to one active position, and the other to the alternate. When both are disabled, valve 150 is closed to flow. Selectively in one of its conditions, the connections of lines 142–145 may go straight through as shown in dotted line. Alternatively, perhaps caused by the actuation of function controller 118a under control of its function switch 118, the flow of pairs of lines 142, 143 and 144, 145 may be switched over oppositely. In short, the operation of function director 150 is to direct the flow either directly from lines 142–145 to lines 151–154, respectively, or to switch it so that fluid from lines 142, 143 goes to lines 153, 154, respectively, and so that fluid from lines 144, 145 goes to lines 151, 152, respectively. It will be seen that the effect of the cross-over valves and the function director is to make for a complete selection of which axis is to be under feed and which under tracer control together with complete control of which direction the stylus is to seek and which direction the device is to feed. These are simply illustrations of selectable functions, and it will be understood that they are merely exemplary. However, the system is believed to be fully understandable from this example.

In the example given, assuming all of the function controllers to be deenergized, and the effect of the valves 140, 141 and 150 as illustrated by dotted line, then the tracer valve connections will be to ports 42 and 43, thereby tracing up and down (in and out relative to the work) in FIG. 1, and the feed will be to ports 36 and 37, feeding to the left. The directions of either of these may be exchanged by the cross-over valves, and the function may be exchanged by the cross-over valves, and the function may be exchanged by operation of the function director, all of which are responsive to the presence or absence of a switch actuator in the rank effective upon the function switches in a given portion of the program.

The circuit also provides for manual override of the circuitry shown, and this is accomplished by means of override valves 160, 162. These valves are shown schematically as having three conditions. One is where the valve is completely shut off, which will be the normal situation when override is not being used, one is when the connection is straight through as shown by dotted lines, and one is where the connections are crossed as shown in solid lines. These conditions may be obtained by use of three-position solenoids such as solenoids 163, 164, which have a central position where the valve is closed and which have two opposite throws effected by switches 166, 167, 168, 169. Alternatively or cumulatively, these valves may be operated manually, if desired. A suitable valve for this purpose is shown in the presently co-pending patent application of Paul J. Weaver, Serial No. 215,597, filed August 8, 1962, entitled "Circuit and Control," assigned to the same assignee as the instant patent application.

It will be seen that valve 160 has inlet lines 170, 171 and outlet lines 172, 173. Similarly, valve 162 has inlet lines 174, 175 and outlet lines 176, 177. Inlet lines 171 and 175 are connected to a pump 180 sometimes called motive power means, which pump is also connected to lines 64a and 64b. Lines 170 and 174 are connected to an exhaust line 181 which also is connected to line 84. Lines 172 and 173 are respectively connected to ports 43 and 42, and lines 176, 177 are respectively connected to lines 153 and 154. Pressure and exhaust can selectively and optionally be applied to any of these ports, either to supplant, override or take the place of fluid supplied from the other control operations, and this enables manual or remotely controlled rapid traverse, or even constant rate feed to be attained as more selectable functions.

It is also possible, when going into rapid traverse, to utilize switches 166–169 as function switches so as to cause rapid traverse of the machine without placing the machine under control of the tracer valve at all. This indicates also that the machine and cycling control is independent of tracer operation, this being merely one preferred example of a tool in which this cycling control finds advantageous application.

The superiority over common switching techniques exemplified by the switch controller 110 may readily be understood by considering FIG. 10, which illustrates a rotary switch 200 with a wiper blade 201 and a plurality of contacts 202 which may or may not have wires 203 connected thereto. An input line 204 is adapted to apply current to the wiper blade, and this wiper blade may be cycled around to make contacts to various leads. However, it will be noted that in every case, substituting a new program requires a complete rewiring job which is avoided in the instant invention that substitutes switch actuators 115 for this purpose, the wiring of the circuit itself being quite permanent and independent of the program.

An example of the use of the illustrated circuitry is shown in FIGS. 3–5, in which ten limit switches are involved. The same switch may be used more than once in the cycle, such as at positions 3 and 7, and 4 and 8. However, for convenience in discussion, each position will be treated as though a separate limit switch were provided at each point. The example is that of a two-pass tracer operation wherein the tracer feed is to the left while the tracer follows the template.

To start the program, the start switch is pressed, or the drum otherwise revolved to a position where the program begins. Thus, in FIG. 3 position 1 is the start, and the program moves the tool in toward position 2. At this point, a limit switch such as switch 90 is struck, which advances the drum and changes the program to feed left to position 3, where a switch such as switch 92 is struck that steps the program to tracer, so that the tool moves inwardly, and duplicates the template's shape.

At point 4, another switch, such as switch 93 is struck, and the drum indexes to a program which moves the tool out to position 5, where a switch such as switch 94 is struck that causes the feed to be to the right until point 6 is reached, when a switch such as switch 96 is struck. This completes the first pass as shown in FIG. 4. Then the next pass proceeds as shown in FIG. 5, extending through points 6–10, inclusive in the same manner with appropriately located limit switches.

The template is provided with conventional lead-in and lead-out portions that are effective during tracer-controlled operations. When the last limit switch is closed at position 10, then the stepper means will cause a rank to be reached where there are no functions in operation, and the device will shut down until it is again restarted. Starting or restarting can be accomplished by manually stepping means 120, or perhaps by simply pulsing it once electrically by means which need not be shown here so that a function controller is actuated by a switch actuator.

FIGS. 6, 7 and 8 illustrate how selecting of functions can achieve different utility of the tool. In this case, it is desired to face a workpiece, and to achieve the combined program shown in FIG. 6 by the separate steps shown in FIGS. 7 and 8. In the first step, motion is from positions 1 to 2, at which time there is rapid traverse to position 3, then a slow tracing over the surface to position 4, then retract to position 5 and return to position 6 at which point the cycle of FIG. 8 is begun which comprises an approach to the workpiece and template and a tracing over it until position 7 is reached, then retract to positions 8 and 9, where the program ends. In this case, there are nine contacts with limit switches, and, depending on the positions involved, there may be nine or fewer of said switches, depending on where the positions actually are. Inasmuch as the limit switches may be disposed wherever desired and that they all are connected to the same common downstream output line 106, as many or as few as desired may be provided so long as the switch actuators 115 are appropriately selected for the specifically addressed limit switch in combination with the selected functions.

The aforementioned fully describes the operation of the control and machine tool. It will be seen that this system, while having many sophisticated features and results in operation, still has at its heart a very simple switch controller 110 on which, by placing switch actuators at selected positions in ranks and rows, permits given limit switches to be addressed at any portion of the program, and then for this specific portion of the program, to cause specific selectable functions to be attained. All of this is achieved without requiring rewiring or modification of the circuit, and a wide assortment of functions are selectable. Of course a drum is only one example. Any movable surface with ranks and rows of actuators will be appropriate.

FIG. 11 shows that this invention is of utility beyond that of two axis control, and that the selectable functions heretofore discussed are merely broad illustrative examples. A bed 250 with longitudinal ways 251 supports a longitudinal slide 252 which in turn carries an adjustment carriage 253 which supports an angle slide 254. Carriage 253 moves slide 254 in and out. Angle ways 255 lie at 45° to the longitudinal ways and carry an angle slide 256 for motion in that direction.

Motors 257 and 258 power slides 252 and 256, respectively. Template 259 is followed by a tracer valve 260 carried by slide 256. This tracer valve is of the single-axis type, and merely advances or retracts slide 256 on its axis. It has no control over slide 252, which usually advances at a constant rate during tracer-controlled operation.

Tool 261 is carried by slide 256 to cut workpiece 262.

It is evident that programming with selectable functions is just as possible with this machine tool as with that of FIG. 1, by providing similar limit switches and the like, and that, both in the specification and claims, recitation of particular selectable functions are merely exemplary and not limitative.

This invention is not to be limited by the embodiment shown in the drawings and described in the description which is given by way of illustration and not of limitation, but only in accordance with the scope of the appended claims.

I claim:

1. A cycling control for a machine tool of the class having a bed, a first slideway mounted on said bed, a first slide mounted on the first slideway, a second slideway mounted on the first slide, a second slide mounted to the second slideway, the slideways having respective axes, the axes being non-parallel and the slides being movable along the respective slideway axis, a cutting tool, a workpiece holder, a template, and a tracer valve including a stylus adapted to trace the contour of the template, the tracer valve and template comprising a first pair and the cutting tool and workpiece constituting a second pair, one member of each pair being mounted to the second slide, and the other member of each pair being mounted to the bed, a first slide motive means, and a second slide motive means, the first slide motive means being adapted to move the first slide relative to the bed along the first axis, and the second slide motive means being adapted to move the second slide relative to the first slide along the second axis, at least one of said motive means being under control of the tracer valve, whereby variations in the template contour are followed by the stylus and duplicated between the cutting tool and workpiece, motive power means selectably applicable directly to the motive means or through the tracer valve to the motive means, the selection of which if any of said motive means is under control of the tracer valve, and the selection of which if any of said motive means is directly powered by the power means exemplifying selectable functions, said cycling control comprising: a power supply including a first and a second terminal; a plurality of limit switches disposed in the path of said slides, each having a conductive and non-conductive condition, said conditions being selectable by contact with a respective slide, whereby movement of a slide to a selected location actuates a respective limit switch to change its conductive condition, each of said limit switches including a first and a second terminal, which terminals are conductively connected in one condition, and disconnected in the other; a plurality of address switches; a plurality of function switches, each of said address and function switches having a conductive and a non-conductive condition, said conditions being selectable, and each of said function and address switches including a power and an output terminal, the first terminals of all limit switches being connected to the first terminal of the power supply, the second terminal of each limit switch being connected to the power terminal of a respective address switch, the power terminals of all the function switches being connected to the first terminal of the power supply; a switch controller comprising a drum with an axis of rotation, the drum having a periphery revoluble around said axis; a plurality of switch actuators on said periphery, said address and function switches being so disposed and arrayed as to be placed in one condition when a switch actuator is adjacent thereto, and in the other condition when one is not, whereby the disposition of switch actuators on the periphery relative to the address and function switches provides means for selecting addresses and functions respective to angular positions of the drum; stepper means for moving the drum in incremental steps, said stepper means including a first and a second terminal, the output terminals of all address switches being connected to one terminal of said stepper means the other terminal of the stepper means being connected to the second terminal of the power supply; a plurality of function controllers each effective to control a function and each having a first and a second terminal, the first terminal of each function controller being connected to the output terminal of a respective function switch, and the second terminal of all function controllers being connected to the second terminal of the power supply, whereby with the drum so disposed and arranged as to actuate a selected address and function switch, the function continues until the respective limit switch is actuated, thereby to step the drum to a new selection.

2. A control according to claim 1 in which the stepper means operates in a cocking motion which does not turn the drum, and in a secondary motion which does turn the drum, the cocking motion being caused by power supplied from an address switch whose limit switch has been actuated, the secondary motion being caused by breaking the circuit to said address switch as the result of the cocking motion.

3. A control according to claim 2 in which the circuit between the stepper means and the address switches includes a first segment of an interrupter switch which opens at the end of the cocking motion.

4. A control according to claim 3 in which a lost-motion link is interposed between the interrupter switch and the stepper means to delay the effect of the cocking and secondary motion.

5. A control according to claim 1 which enables the stepper means optionally to be repetitively actuated, or actuated one increment at a time, including relay means interconnected between the first and second power supply terminals, a selector switch and a single step switch in parallel with each other, each having an open and a closed position, and both being interposed between the power supply and the relay, a second segment of an interrupter switch in parallel with the selector switch and single step switch, said interrupter switch being under control of the stepper means; a pair of relay switches under control of said relay, one of said relay switches being interposed between the first terminal of the power supply and the power terminals of all function switches, and the other being in series connection with said second segment, the relay switches being closed when the relay is actuated, the second relay switch and the second segment forming a latch circuit for the relay which is interrupted by operation of the stepper means.

6. A control according to claim 5 in which the stepper means operates in a cocking motion which does not turn the drum, and in a secondary motion which does turn the drum, the cocking motion being caused by power supplied from an address switch whose limit switch has been actuated, the secondary motion being caused by breaking the circuit to said address switch as the result of the cocking motion.

7. A control according to claim 6 in which the circuit between the stepper means and the address switches includes a first segment of an interrupter switch which opens at the end of the cocking motion.

8. A control according to claim 7 in which a lost-motion link is interposed between the interrupter switch and the stepper means to delay the effect of the cocking and secondary motion.

9. A control according to claim 1 in which each of said slide motive means comprises a fluid motor having a pair of supply ports, and in which valve means is provided under control of a respective function controller to select which of said last named pairs is connected to the motive power means, and in what orientation.

10. A control according to claim 9 in which one of said motive power means includes a tracer valve, and in which the other motive power means constitutes a direct power supply without variably-controlled inter-position.

11. A cycling control for a machine tool of the class having a bed, a first slideway mounted on said bed, a first slide mounted on the first slideway, a second slideway mounted on the first slide, a second slide mounted to the second slideway, the slideways having respective axes, the axes being non-parallel and the slides being movable along the respective slideway axis, a first slide motive means, and a second slide motive means, the first slide motive means being adapted to move the first slide relative to the bed along the first axis, and the second slide motive means being adapted to move the second slide relative to the first slide along the second axis, motive power means selectively applicable to the motive means, the selection of which, if either of said motive means is operative exemplifying a selectable function, said cycling control comprising: a power supply including a first and a second terminal; a plurality of limit switches disposed in the path of said slides, each having a conductive and a non-conductive condition, said conditions being selectable by contact with a respective slide, whereby movement of a slide to a selected location actuates a respective limit switch to change its conductive condition, each of said limit switches including a first and a second terminal, which terminals are conductively connected in one condition, and disconnected in the other; a plurality of address switches; a plurality of function switches, each of said address and function switches having a conductive and a non-conductive condition, said conditions being selectable, and each of said function and address switches including a power and an output terminal, the first terminals of all limit switches being connected to the first terminal of the power supply, the second terminal of each limit switch being connected to the power terminal of a respective address switch, the power terminals of all the function switches being connected to the first terminal of the power supply; a switch controller comprising a drum with an axis of rotation, the drum having a periphery revoluble around said axis; a plurality of switch actuators on said periphery, said address and function switches being so disposed and arrayed as to be placed in one condition when a switch actuator is adjacent thereto, and in the other condition when one is not, whereby the disposition of switch actuators on the periphery relative to the address and function switches provides means for selecting addresses and functions respective to angular positions of the drum; stepper means for moving the drum in incremental steps, said stepper means including a first and a second terminal, the output terminals of all address switches being connected to one terminal of said stepper means the other terminal of the stepper means being connected to the second terminal of the power supply; a plurality of function controllers each effective to control a function and each having a first and a second terminal, the first terminal of each function controller being connected to the output terminal of a respective function switch, and the second terminal of all function controllers being connected to the second terminal of the power supply, whereby with the drum so disposed and arranged as to actuate a selected address and function switch, the function continues until the respective limit switch is actuated, thereby to step the drum to a new selection.

12. A control according to claim 11 in which the stepper means operates in a cocking motion which does not turn the drum, and in a secondary motion which does turn the drum, the cocking motion being caused by power supplied from an address switch whose limit switch has been actuated, the secondary motion being caused by breaking the circuit to said address switch as the result of the cocking motion.

13. A control according to claim 12 in which the circuit between the stepper means and the address switches includes a first segment of an interrupter switch which opens at the end of the cocking motion.

14. A control according to claim 13 in which a lost-motion link is interposed between the interrupter switch and the stepper means to delay the effect of the cocking and secondary motion.

15. A control according to claim 11 which enables the stepper means optionally to be repetitively actuated, or actuated one increment at a time, including relay means interconnected between the first and second power supply terminals, a selector switch and a single step switch in parallel with each other, each having an open and a closed position, and both being interposed between the power supply and the relay, a second segment of an interrupter switch in parallel with the selector switch and single step switch, said interrupter switch being under control of the stepper means; a pair of relay switches under control of said relay, one of said relay switches being interposed between the first terminal of the power supply and the power terminals of all function switches, and the other being in series connection with said second segment, the relay switches being closed when the relay is actuated, the second relay switch and the second segment forming a latch circuit for the relay which is interrupted by operation of the stepper means.

16. A control according to claim 15 in which the stepper means operates in a cocking motion which does not turn the drum, and in a secondary motion which does turn the drum, the cocking motion being caused by power supplied from an address switch whose limit switch has been actuated, the secondary motion being caused by breaking the circuit to said address switch as the result of the cocking motion.

17. A control according to claim 16 in which the circuit between the stepper means and the address switches includes a first segment of an interrupter switch which opens at the end of the cocking motion.

18. A control according to claim 17 in which a lost-motion link is interposed between the interrupter switch and the stepper means to delay the effect of the cocking and secondary motion.

19. A control according to claim 11 in which each of said slide motive means comprises a fluid motor having a pair of supply ports, and in which valve means is provided under control of a respective function controller to select which pair is connected to the motive power means, and in what orientation.

No references cited.

WILLIAM W. DYER, JR., *Primary Examiner.*

G. A. DOST, *Assistant Examiner.*